(12) United States Patent
Asakage et al.

(10) Patent No.: US 7,268,192 B2
(45) Date of Patent: Sep. 11, 2007

(54) PROCESS FOR PRODUCING HIGH-PURITY EPOXY RESIN AND EPOXY RESIN COMPOSITION

(75) Inventors: Hideyasu Asakage, Tokyo (JP); Nobuhisa Saito, Tokyo (JP); Yukio Nakamura, Tokyo (JP)

(73) Assignee: Tohto Kasei Co., Ltd, Tokyo (JP)

( * ) Notice: Subject to any disclaimer, the term of this patent is extended or adjusted under 35 U.S.C. 154(b) by 396 days.

(21) Appl. No.: 10/511,553

(22) PCT Filed: Feb. 16, 2004

(86) PCT No.: PCT/JP2004/001646

§ 371 (c)(1),
(2), (4) Date: Oct. 18, 2004

(87) PCT Pub. No.: WO2004/072146

PCT Pub. Date: Aug. 26, 2004

(65) Prior Publication Data

US 2005/0131195 A1    Jun. 16, 2005

(30) Foreign Application Priority Data

Feb. 17, 2003    (JP)    .............................. 2003-038326

(51) Int. Cl.
*C08L 63/00*    (2006.01)
*C08L 63/02*    (2006.01)
*H01L 21/56*    (2006.01)

(52) U.S. Cl. ...................... 525/523; 438/127; 525/507; 525/533

(58) Field of Classification Search ...................... None
See application file for complete search history.

(56) References Cited

U.S. PATENT DOCUMENTS 4,535,150 A    8/1985    Hunter 4,668,807 A    *    5/1987    Darbellay et al. .......... 549/542

FOREIGN PATENT DOCUMENTS

| JP | 59-43014 A | * | 3/1984 |
|---|---|---|---|
| JP | 61-136513 | | 6/1986 |
| JP | 62-064817 | | 3/1987 |
| JP | 1-168722 | | 7/1989 |
| JP | 5-320309 | | 12/1993 |
| JP | 6-298904 | | 10/1994 |
| JP | 2000-95975 | | 4/2000 |
| JP | 2000-239346 | | 9/2000 |
| JP | 2002-37851 | | 2/2002 |
| JP | 2002-114834 | | 4/2002 |
| JP | 2002-338657 | | 11/2002 |

OTHER PUBLICATIONS

Japanese Patent Abstract No. 62-064817. dated Mar. 23, 1987.

* cited by examiner

*Primary Examiner*—Robert Sellers
(74) *Attorney, Agent, or Firm*—Miller, White, Zelano, Branigan, P.C.

(57) ABSTRACT

A process for production a high purity epoxy compound with total chlorine content of 500 ppm or less is characterized in that alkali metal hydroxide is added to a bifunctional epoxy compound represented by the general formula (I), in which content of the component with n=0 is not less than 70% and less than 100%, and that reaction is caused to take place at a temperature of 95-150° C. to produce a multifunctional epoxy compound represented by the general formula (II)

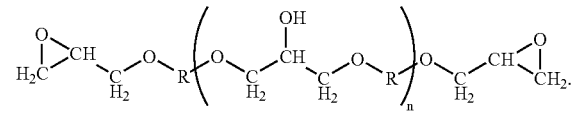

13 Claims, No Drawings

PROCESS FOR PRODUCING HIGH-PURITY EPOXY RESIN AND EPOXY RESIN COMPOSITION

FIELD OF THE INVENTION

The present invention relates to a method of manufacturing a high purity epoxy compound and to an epoxy resin composition using the high purity epoxy compound and used for reliably sealing electronic components.

BACKGROUND OF THE INVENTION

Because of their excellent characteristics, epoxy resins have been widely used in various fields, such as electrical and electronic devices, paints, in the fields of architecture and civil engineering, and adhesives. Especially in the field of electrical and electronic devices, epoxy resins have been widely used as sealing material for electronic components because of their excellent characteristics in electrical insulation and thermal resistance. In recent years, due to tendency for more and more highly integrated semiconductor device, for further reduction of size and thickness of packages, and for higher packaging efficiency, improvement of reliability is strongly required for epoxy resins used in these applications.

Two main approaches have been adopted for improving reliability of epoxy resins. In the first approach, decrease of the content of halogen-containing group which is present in trace amount in epoxy resins has been attempted. It has been known that hydrolysis of a halogen-containing group in epoxy resins results in degradation of electrical insulation and corrosion of lead wires, and thus adversely affects reliability of electronic devices.

In the second approach, reduction of stress and reduction of moisture absorption of hardened epoxy resins have been attempted. Conventionally, an epoxy resin composition that is composed of a cresol novolac type epoxy resin as a epoxy resin, a phenolic resin as a curing agent, and silica or the like as a filler, has been widely used for sealing semiconductor devices. However, although the cresol novolac epoxy resin has excellent thermal resistance, it has a disadvantage that hardened product lacks flexibility so that cracks tend to be produced in the moldings.

In order to obtain an epoxy resin composition with low hygroscopicity, it is desirable to use the so-called filler high-filled type epoxy resin composition that contains a large amount of filler with low hygroscopicity such as silica. However, use of a cresol-novolac resin leads to increase in the viscosity of the epoxy resin composition at the time of molding, and may result in problems such as molding failure or damage to the sealed micro-electronic parts.

Various processes have been proposed to resolve these problems. In the above-mentioned first approach to improving reliability of an epoxy resin composition, that is, in order to reduce a halogen containing group that is present in trace amount in an epoxy resin, a process is disclosed in Japanese Patent Publication No. 61-136513, in which an alkali metal hydroxide is added to react with an epoxy resin in the presence of isobutanol or a solvent consisting of a secondary alcohol. A process is also disclosed in Japanese Patent Publication No. 62-64817, in which an epoxy resin is reacted in the presence of alcohols, alkali metal hydroxide, and a phase transfer catalyst at temperature of 20~50° C.

Since, in the process as disclosed in the above-mentioned Japanese Patent Publication No. 61-136513, isobutanol or a secondary alcohol is used, reaction of these alcohols with the epoxy group is induced during the reaction and the epoxy equivalent is thereby undesirably increased. Also in the process as disclosed in the above-mentioned Japanese Patent Publication No. 62-64817, although the reaction takes place at relatively low temperature, a phase transfer catalyst is used and reaction of alcohols and the epoxy group is likely to be induced. Use of expensive catalyst is a disadvantage as industrial application.

A process is disclosed in Japanese Patent Publication No. 62-256821, in which halogen content in epoxy resin is decreased by processing a raw epoxy resin which is prepared by reaction of bisphenols obtained by substituting ortho-position of phenolic hydroxide, and epihalohydrin, in an alkaline solution with water content at a predetermined level or lower. Also in Japanese Patent Publication No. 63-268723, a process is disclosed for decreasing hydrolyzable halogen content of epoxy resin by adding aqueous solution of alkali metal hydroxide and hydrophobic solvent to a raw epoxy resin prepared from poly-phenol and epihalohydrin, and by extracting water from the system by azeotrope of the hydrophobic solvent and water to thereby give rise to ring reclosure reaction.

In the process disclosed in the above-mentioned Japanese Patent Publication No. 62-256821, as described in the specification of the Patent Publication, total chlorine content of 600 ppm or lower is difficult to be achieved except for the epoxy resin having the specific structure which is obtained by reaction of bisphenol having substituted ortho-position of phenolic hydroxide, and epihalohydrin. Even when total chlorine content of 600 ppm or lower is achieved, undesirable reactions such as ring opening of the epoxy group may occur, as described in the Patent Publication, so that this method cannot be used for general industrial applications.

In the process disclosed in the above-mentioned Japanese Patent Publication No. 63-268723, due to high water content of the system in the initial stage of the reaction, the epoxy group may react with water in the system using the alkali metal hydroxide as a catalyst, resulting in ring opening of the epoxy group. As a result, α-glycol may be produced, leading to lowering of the epoxy group content. Produced α-glycol has a hydoxide group of primary alcohol with relatively high reactivity. Thus, when an epoxy resin with sufficiently low chlorine content is to be obtained, the hydroxide group of the produced α-glycol may react with the epoxy group, which may results in undesirable polymerization or gel formation.

In the second approach to improving reliability of an epoxy resin composition, that is, in the attempt to decrease stress and moisture absorption of the hardened epoxy resin, a low molecular weight bi-functional epoxy resin composition having two epoxy groups per molecule has been conventionally used effectively. Since cross-link density is low for bi-functional epoxy resin, the hardened product is of low stress, and by using a low molecular weight epoxy resin, it is possible to overcome the problem of molding failure and damage to the sealed minute electronic components even when a large amount of filler is filled in the epoxy resin composition. However, since an epoxy resin composition using such a bi-functional epoxy resin has lower cross-link density as compared to an epoxy resin composition using a multi-functional epoxy resin, it has a disadvantage that the thermal resistance is also degraded.

In order to resolve this problem, a process for production has been known in which alcoholic hydroxide group that is present in the bi-functional epoxy resin is reacted with epichlorohydrin to obtain glycidyl ether, and thus to provide branching structure of glycidyl ether in the molecule. Also a process is disclosed in Japanese Patent Publication No. 04-353517, in which alcoholic hydroxide group in an epoxy resin having three or more phenolic glycidyl ethers in a molecule, is reacted with epichlorohydrin to obtain glycidyl ether and thereby to improve thermal resistance and water resistance. However, although these processes are effective in improving thermal resistance and water resistance, multi-functionalization by introducing an epoxy resin of short chain length such as epichlorohydrin may result in increase of the elastic modulus, and therefore is undesirable from the viewpoint of decreasing stress.

Especially in recent years, due to remarkable progress toward more and more highly integrated semiconductor device, toward reduced size and thickness of packages, and higher packaging efficiency, improvement of reliability is strongly required for epoxy resins used in these applications, and therefore, there is still a strong need for decrease of the content of halogen containing group that is present in trace amount in epoxy resins as well as for reduction of stress and moisture absorption of hardened epoxy resins.

DISCLOSURE OF THE INVENTION

It is therefore an object of the present invention to provide an epoxy resin that permits the content of halogen containing group that is present in trace amount in epoxy resin to be decreased, and at the same time permits stress and moisture absorption of the hardened epoxy resin to be reduced.

The present inventors have found, after intensive study conducted to resolve above problems, a novel fact that, when total chlorine content of an epoxy resin is at a specified level or lower and when the epoxy resin has a specified branching structure, above-mentioned problems can be overcome, and thus have arrived at the present invention.

Thus, in accordance with the present invention, there is provided a process for production of a high-purity epoxy compound with total chlorine content of less than 500 ppm, characterized in that an epoxy compound represented by the following general formula (I):

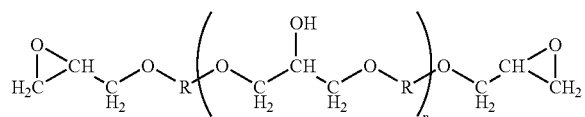

(wherein, R represents a dihydric phenol compound residue and/or a dihydric alcohol compound residue; and n represents a numerical value with the average greater than 0 and not greater than 10), in which the proportion of the component having n equal to 0 is more than 70% and less than 100%, is reacted in the presence of alkali metal hydroxide at temperature of 95° C.~150° C. to produce an epoxy compound represented by the following general formula (II):

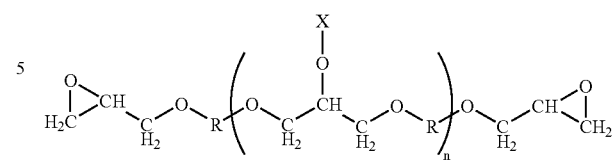

[wherein, R represents a dihydric phenol compound residue and/or a dihydric alcohol compound residue; n represents a numerical value with the average greater than 0 and not greater than 10; and X is a hydrogen atom or a group represented by the following general formula (III):

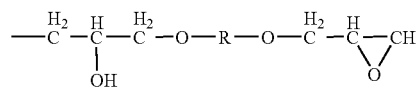

(wherein, R has the above-mentioned meaning)], in which component with X represented by the general formula (III) is always contained.

In the above-described process, in accordance with a preferred aspect, the manufactured epoxy compound consists of an epoxy compound represented by the general formula (I) in the ratio of not less than 90% and less than 100% and an epoxy compound represented by the general formula (II) in the ratio of greater than 0% and not greater than 10%.

Preferably, the above-mentioned alkali metal hydroxide is potassium hydroxide.

The above-described process is preferably implemented by using 5~100 g of potassium hydroxide per 1 kg of the epoxy compound represented by the general formula (I) and by causing it to react as an aqueous solution of potassium hydroxide of 80% or higher in concentration. Preferably, in the above-described method, reaction is caused to occur in the presence of a tertiary alcohol.

Preferably, the epoxy compound represented by the above-mentioned general formula (I) is an epoxy compound represented by the following general formula (IV)

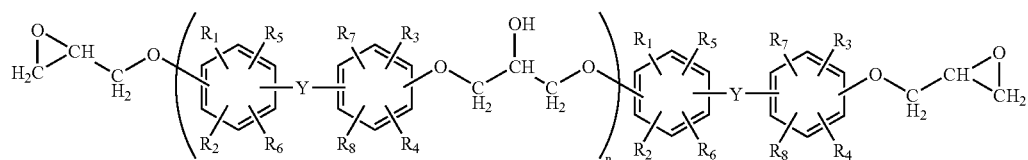

[wherein, $R_1$~$R_8$ may be same or different, and each of $R_1$~$R_8$ is a hydrogen, alkyl, allyl, phenyl group or halogen atom; Y represents a direct bond or alkyl with carbon number of 1~20, allyl, phenyl, aralkyl, biphenylaralkyl, oxygen, sulphur, sulfone, or carboxyl group; and n is a numerical value with average greater than 0 and not greater than 10] and/or an epoxy compound represented by the following general formula (V):

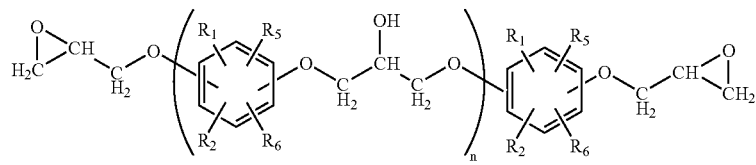

[wherein, $R_1$, $R_2$, $R_5$, and $R_6$ represent hydrogen, alkyl, allyl, phenyl group, or halogen atom, and may be same or different; and n is a numerical value with average greater than 0 and not greater than 10].

In accordance with the present invention, there is also provided a high purity epoxy resin composition and its hardened product used for sealing electronic parts that contain a high purity epoxy compound obtained by the above-described manufacturing method and a curing agent for the epoxy resin as essential components.

DESCRIPTION OF THE PREFERRED EMBODIMENTS

An epoxy resin according to the present invention is a high purity epoxy compound with total chlorine content of 500 ppm or lower, which contains a bifunctional epoxy compound represented by the following general formula (I):

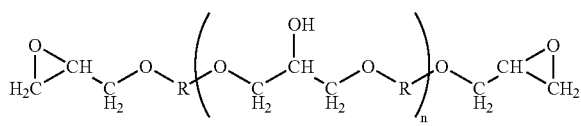

(wherein, R represents a dihydric phenol compound residue and/or a dihydric alcohol compound residue; and n represents a numerical value with the average greater than 0 and not greater than 10), and a trifunctional epoxy compound represented by the following general formula (II):

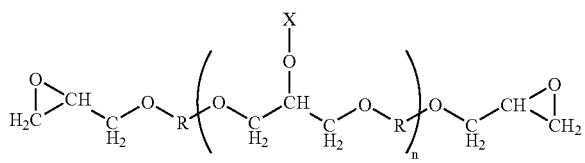

[wherein, R represents a dihydric phenol compound residue and/or a dihydric alcohol compound residue; n represents a numerical value with the average greater than 0 and not greater than 10; and X is a hydrogen atom or a group represented by the following general formula (III):

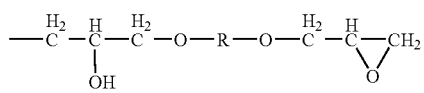

(wherein, R has the above-mentioned meaning)]. Here, the term "total chlorine content" refers to the amount of chlorine as measured by the method specified in JIS K-7246, and usually all forms of chlorine-containing groups generated in an epoxy resin using epichlorohydrin are measured.

Specifically, 1,2-chlorohydrin containing group represented by the following formula (VI):

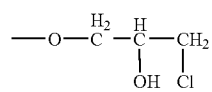

1,3-chlorohydrin containing group represented by the following formula (VII):

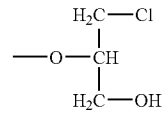

and chloromethyl containing group represented by the following formula (VIII):

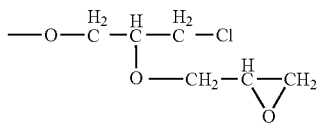

are known as chlorine-containing groups.

Among them, the chlorine-containing group which has 1,2-chlorohydrin containing group as main component is known as easily hydrolyzable chlorine, and can be decreased relatively easily. However, in order to assure high reliability, it is not sufficient to decrease the chlorine-containing group which has 1,2-chlorohydrin containing group as main component, but also 1,3-chlorohydrin containing group represented by the formula (VII) and chloromethyl containing group represented by the formula (VIII) need to be decreased. Especially when total chlorine content of an epoxy resin is 500 ppm or lower, the epoxy resin has remarkably excellent reliability. More preferably, total chlorine content is 350 ppm or lower.

The proportion of the component of the bifunctional epoxy compound of the general formula (I) used in the present invention with n equal to 0 is 70% or greater and less than 100%. If the proportion of the component with n equal to 0 is less than 70%, the epoxy resin exhibits undesirable increase in viscosity. Content of the component with n equal to 0 is preferably 75%~99%, and more preferably 80%~99%. Content of the component with n equal to 0 is analyzed using gel permeation chromatography with differential refractometer as a detector, and is numerically derived as area percentage of the obtained chromatogram.

The high purity epoxy compound of the present invention contains a multi-functional epoxy compound represented by the following general formula (II):

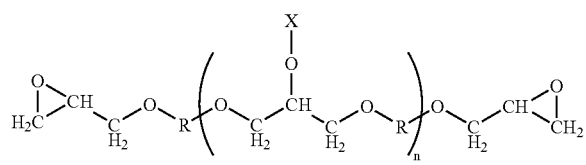

[wherein, R represents a dihydric phenol compound residue and/or a dihydric alcohol compound residue; n represents a numerical value with the average greater than 0 and not greater than 10; and X is a hydrogen atom or a group represented by the following general formula (III):

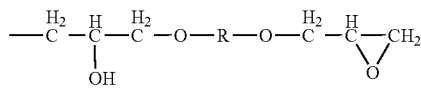

(wherein, R has the above-mentioned meaning)] in an amount greater than 0% and not greater than 10%.

The multi-functional epoxy compound represented by the above-mentioned general formula (II) has three or more epoxy groups in a molecule, and includes compounds having specific multi-functional branching structure. More specifically, it includes a compound having bifunctional epoxy resin added to a hydroxide group in a molecule of an epoxy compound. This has, unlike conventionally known multi-functional compound having epichlorohydrin added to a hydroxide group in a molecule of an epoxy compound, a long molecular chain in a branch of side chain, so that distance between cross-linking points becomes relatively large. Thus, while it retains high thermal resistance, it is unlikely to induce large increase in elastic modulus.

Content of the multi-functional epoxy compounds represented by the general formula (II) in the high purity epoxy compound is preferably 1~10%. Content of less than 1% is undesirable in view of thermal resistance, and content of more than 10% may induce increase in elastic modulus, and is undesirable in view of stress reduction. More preferably the content is 1~6%, and still more preferably 2~5%. These compounds are measured by high performance liquid chromatography using an UV visible detector at the measuring wavelength of 285 nm, and the content is numerically derived from area percentage of the obtained chromatogram. These compounds are identified by high performance liquid chromatography using a mass spectrometer as a detector.

The high purity epoxy compound of the present invention is manufactured from bifunctional epoxy compound represented by the general formula (I), in which content of the component with n=0 is not less than 70% and less than 100%, by adding 5~100 g of potassium hydroxide per 1 kg of the bifunctional epoxy compound, and causing the reaction to take place at temperature of 95~150° C. and at concentration of aqueous potassium hydroxide solution in the system of not less than 80%.

Suitable examples of the bifunctional epoxy compounds represented by the general formula (I) includes conventionally known epoxy compound, such as: bisphenol type epoxy resins as reaction products of bisphenols such as bisphenol A, bisphenol F, bisphenol C, bisphenol K, bisphenol Z, bisphenol S, tetramethyl bisphenol A, tetramethyl bisphenol F, tetramethyl bisphenol S, tetramethyl bisphenol Z, etc., with epihalohydrin; biphenol type epoxy resins as reaction products of biphenols such as biphenol, tetramethyl biphenol, etc., with epihalohydrin; dihydroxy diphenyl sulfide type epoxy resins as reaction products of dihydroxy diphenyl sulfides such as dihydroxy diphenyl sulfide, 4,4-thiobis(3-methyl-6-tert-butylphenol), etc., with epihalohydrin; dihydroxy benzene type epoxy resins as reaction products of dihydroxy benzenes such as catechol, resorcin, methyl resorcin, hydroquinone, monomethyl hydroquinone, dimethyl hydroquinone, trimethyl hydroquinone, mono-tert-butyl hydroquinone, di-tert-butyl hydroquinone, etc., with epihalohydrin; dihydroxy naphthalene type epoxy resins as reaction products of dihydroxy naphthalenes such as dihydroxy naphthalene, dihydroxy methyl naphthalene, dihydroxy methyl naphthalene, etc., with epihalohydrin.

These epoxy compounds are advantageously used in repeating unit of repetition number n, the average of which is preferably 10 or less (excluding 0), more preferably 5 or less, and still more preferably 3 or less. The average of the number n can be determined, for example from the number average molecular weight as measured by GPC or the like, or from the measurement of epoxy equivalent representing the terminal functional group.

Examples of suitable epoxy compounds also include epoxy resins as reaction products of phenols such as condensation products of phenols and/or naphthols and aldehydes, condensation products of phenols and/or naphthols and xylylene glycol, condensation products of phenols and/or naphthols and isopropenyl acetophenone, reaction products of phenols and/or naphthols and dicyclopentadiene, condensation products of phenols and/or naphthols and biphenyl type condensing agents, etc., with epihalohydrin.

Examples of the above-mentioned phenols include phenol, cresol, xylenol, butyl phenol, amyl phenol, nonyl phenol, butylmethyl phenol, trimethyl phenol, phenyl phenol, etc. Examples of the above-mentioned naphthols include 1-naphthol, 2-naphthol, etc.

Examples of aldehydes include formaldehyde, acetaldehyde, propyl aldehyde, butyl aldehyde, valer aldehyde, capron aldehyde, benzaldehyde, chloroaldehyde, bromoaldehyde, glyoxal, malon aldehyde, succinaldehyde, glutaraldehyde, adipinaldehyde, pimelinaldehyde, sebacinaldehyde, acrolein, crotonaldehyde, salicylaldehyde, phthalaldehyde, hydroxybenz aldehyde, etc.

Examples of biphenyl type condensing agents include bis(methylol) biphenyl, bis(methoxymethyl) biphenyl, bis(ethoxymethyl) biphenyl, bis(chloromethyl) biphenyl, etc.

Other specific examples of bifunctional epoxy compounds represented by the general formula (I) include epoxy resins as reaction products of ethylene oxide and/or propylene oxide adducts of bisphenols such as bisphenol A, bisphenol F, bisphenol C, bisphenol K, bisphenol Z, bisphenol S, tetramethyl bisphenol A, tetramethyl bisphenol F, tetramethyl bisphenol S, tetramethyl bisphenol Z, etc., with epihalohydrin; epoxy resins as reaction products of ethylene oxide and/or propylene oxide adducts of biphenols such as biphenol, tetramethylbiphenol, etc., with epihalohydrin; epoxy resins as reaction products of ethylene oxide and/or propylene oxide adducts of dihydroxy diphenyl sulfides such as dihydroxy diphenyl sulfide, 4,4-thiobis(3-methyl-6-tert-butylphenol), etc., with epihalohydrin; dihydroxybenzene type epoxy resins as reaction products of ethylene oxide and/or propylene oxide adducts of dihydroxybenzenes such as catechol, resorcin, methyl resorcin, hydroquinone, monomethyl hydroquinone, dimethyl hydroquinone, trimethyl hydroquinone, mono-tert-butyl hydroquinone, di-tert-butyl hydroquinone, etc., with epihalohydrin; and epoxy resins as reaction products of alcohols such as 1,4-butanediol, 1,6-hexanediol, 1,4-dihexanedimethanol, etc., with epihalohydrin.

The reaction according to the manufacturing method of the present invention requires addition of 5~100 g of alkali metal hydroxide per 1 kg of the epoxy compound. Suitable alkali metal hydroxide include sodium hydroxide, potassium hydroxide, etc. Preferably, potassium hydroxide is used, and may be used in the form of solid or as aqueous solution. Amount of the added potassium hydroxide may vary depending on the total chlorine content of the epoxy compound to be reacted, within the range of 5~100 g per 1 kg of the epoxy compound.

If this amount is less than 5 g, sufficient effect on decrease of the total chlorine content cannot be obtained. If the added amount is more than 100 g per 1 kg of the epoxy compound, significant effect on decrease of the total chlorine content cannot be obtained, and increase of the consumption of potassium hydroxide entails undesirable increase of production cost. The added amount per 1 kg of the epoxy compound is preferably 5~80 g, and more preferably 10~50 g. The repetition number n of the repeating units in the multi-functional epoxy compounds represented by the general formula (II) is preferably not greater than 10 in average (excluding 0), more preferably not greater than 5, and still more preferably not greater than 3.

Reaction temperature of the above-mentioned reaction is in the range of 95~150° C. If the reaction temperature is lower than 95° C., effect on the decrease of total chlorine content and production of the multi-functional epoxy compound represented by the general formula (II) are not satisfactory. If the reaction temperature is higher than 150° C., undesirable remarkable decrease of the epoxy group and gel formation may occur. More preferably, the reaction temperature is 120~140° C. The reaction may be performed under reduced pressure, under ordinary pressure, or under high pressure, but is preferably performed under ordinary pressure in view of inexpensive production equipment. Reaction time (duration) is preferably 10 minutes~10 hours, but is typically 30 minutes~5 hours.

It is also necessary for the reaction to be performed under the condition that the concentration of aqueous solution of the alkali metal hydroxide in the reaction system is 80% or higher. If water content in the reaction system is too high, water is likely to react with the epoxy group, leading to undesirable increase in epoxy equivalent. Thus, when water is present in the reaction system, it is necessary to perform dehydration treatment in advance such that, when potassium hydroxide is added, concentration of the aqueous solution of 80% or higher is obtained. Examples of this dehydration treatment include dehydration by heating under ordinary pressure or under reduced pressure, dehydration using dehydrating agent such as sodium sulfate anhydride, molecular sieve, etc.

The reaction may be performed in the presence of an organic solvent. Examples of suitable organic solvents include ketone based solvents such as methyl ethyl ketone, methyl isobutyl ketone, etc., hydrocarbon based solvents such as toluene, xylene, etc., alcohol based solvents such as methanol, ethanol, etc., cellosolve based solvents such as methyl cellosolve, ethyl cellosolve, etc., ethers such as dioxane, diethoxy ethane, etc., amide based solvents such as dimethyl formamide, etc., polar aprotic solvents such as dimethylsulfoxide, etc. Especially preferable solvents are methyl isobutyl ketone, and toluene. Phase transfer catalysts such as quaternary ammonium salt, quaternary phosphonium salt, etc., may also be used.

Potassium hydroxide used in the reaction is preferably in the form of solid potassium hydroxide of 90% or higher in purity. By using solid potassium hydroxide, introduction of unnecessary moisture into the system can be minimized. Especially, purity of 95% or higher is more preferable.

The reaction of the epoxy compound with potassium hydroxide preferably takes place in the presence of a tertiary alcohol. When a tertiary alcohol is present, potassium hydroxide can be effectively dispersed even if water content in the system is low. Therefore, this is desirable, since reaction proceeds smoothly, and reaction time, as well as consumption of potassium hydroxide, can be reduced. Further, unlike primary and secondary alcohol, tertiary alcohol is difficult to react with epoxy group, and therefore, decrease of epoxy group or other undesirable reaction is unlikely to occur. Examples of tertiary alcohols include tert-butyl alcohol.

The high purity epoxy resin composition of the present invention is an epoxy resin composition for sealing electronic parts, which comprises, as essential components, a high purity epoxy compound having specified branching structure of the present invention and a curing agent for the epoxy resin. The epoxy resin composition of the present invention may be used in conjunction with conventionally known epoxy resins such as bisphenol type epoxy resins, bromo-bisphenol type epoxy resins, novolac type epoxy resins, aliphatic epoxy resins, alicyclic epoxy resins, or the like.

The high purity epoxy resin of the present invention comprises a curing agent for the epoxy resin as an essential component, and any conventionally known curing agent for epoxy resins may be used. Specific examples include bisphenols such as bisphenol A, bisphenol F, bisphenol C, bisphenol K, bisphenol Z, bisphenol S, tetramethyl bisphenol A, tetramethyl bisphenol F, tetramethyl bisphenol S, tetramethyl bisphenol Z, dihydroxy diphenyl sulfide, 4,4-thiobis (3-methyl-6-tert-butylphenol), etc., dihydroxy benzenes such as catechol, resorcin, methyl resorcin, hydroquinone, monomethyl hydroquinone, dimethyl hydroquinone, trimethyl hydroquinone, mono-tert-butyl hydroquinone, di-tert-butyl hydroquinone, etc., dihydroxy naphthalenes such as dihydroxy naphthalene, dihydroxy methyl naphthalene, dihydroxy methyl naphthalene, trihydroxy methyl naphthalene, etc., and phenol compounds such as condensation products of phenols and/or naphthols and aldehydes, condensation products of phenols and/or naphthols and xylylene glycol, condensation products of phenols and/or naphthols and isopropenyl acetophenone, reaction products of phenols and/or naphthols and dicyclopentadiene, condensation products of phenols and/or naphthols and biphenyl type condensing agents, etc.

The above-mentioned phenols include phenol, cresol, xylenol, butyl phenol, amyl phenol, nonyl phenol, butylmethyl phenol, trimethyl phenol, phenyl phenol, etc., and the above-mentioned naphthols include 1-naphthol, 2-naphthol, etc.

Examples of aldehydes include formaldehyde, acetaldehyde, propyl aldehyde, butyl aldehyde, valer aldehyde, capron aldehyde, benzaldehyde, chloroaldehyde, bromoaldehyde, glyoxal, malon aldehyde, succinaldehyde, glutaraldehyde, adipinaldehyde, pimelinaldehyde, sebacinaldehyde, acrolein, crotonaldehyde, salicylaldehyde, phthalaldehyde, hydroxybenz aldehyde, etc.

Examples of biphenyl type condensing agents include bis(methylol) biphenyl, bis(methoxymethyl) biphenyl, bis(ethoxymethyl) biphenyl, bis(chloromethyl) biphenyl, etc.

Other commonly known curing agents include acid anhydrides such as methyl tetrahydro phthalic anhydride, hexahydro phthalic anhydride, pyromellitic dianhydride, phthalic anhydride, trimellitic anhydride, etc., and amine based compounds such as diethylene triamine, triethylene tetramine, metaxylene diamine, isophorone diamine, diaminodiphenyl methane, diaminodiphenyl sulfone, diaminodiphenyl ether, dicyan diamide, and polyamidamine as condensation products of dimer acids and polyamines.

Examples of curing agents which act as curing agents by inducing polymerization of epoxy groups include phosphine compounds such as triphenyl phosphine, phosphonium salts such as tetraphenyl phopsphonium bromide, imidazoles such as 2-methyl imidazole, 2-phenyl imidazole, 2-ethyl-4-methyl imidazole, 2-undecyl imidazole, 1-cyanoethyl-2-methyl imidazole, etc., and imidazole salts thereof with trimellitic acid, isocyanuric acid, and boron, etc., amines such as benzyl dimethyl amine, 2,4,6-tris(dimethylaminomethyl) phenol, etc., quaternary ammonium salts such as trimethyl ammonium chloride, etc., diazabicyclo compounds and salts thereof with phenols, phenol novolac resins, etc., complex of boron trifluoride with amines, ether compounds, etc., aromatic phosphonium or iodonium salts. These curing agents may be used alone or in combination of two or more of them.

Blending ratio of the curing agent for epoxy resin used in the epoxy resin composition of the present invention is 0.5~1.5 equivalent, preferably 0.8~1.2 equivalent, of the functional group of the curing agent per 1 equivalent of the epoxy group. Blending ratio of the curing agent that hardens the resin by inducing polymerization of the epoxy resin, is 0.1~10 parts by weight, preferably 0.2~5 parts by weight, relative to 100 parts by weight of the epoxy resin.

A curing accelerator may be used as required in the epoxy resin composition of the present invention. Examples of suitable curing accelerators include phosphines, imidazoles, tertiary amines, boron trifluoride, etc. These curing accelerators may be used alone or in combination of two or more of them. Blending ratio of the curing accelerator is 0.1~10 parts by weight, more preferably 0.2~5 parts by weight, per 100 parts by weight of total epoxy resins used in the epoxy resin composition.

Inorganic filler may be used as required in the epoxy resin composition. Examples of useful inorganic filler include fused silica, crystalline silica, glass powder, alumina, calcium carbonate, etc. These inorganic filler may be used alone or in combination of two or more of them. Blending ratio is 30~98% by weight, preferably 50~95% by weight, relative to total weight of the epoxy resin composition.

Flame retardant, coupling agent, fiber reinforcing agent, pigment, and plasticizer may be blended as required to the epoxy resin composition of the present invention.

As the bifunctional epoxy compound used in the present invention, an epoxy compound represented by the general formula (IV) and/or the general formula (V) is preferable. Examples of the epoxy compound represented by the general formula (IV) include bisphenol type epoxy resin as reaction products of bisphenols such as bisphenol A, bisphenol F, bisphenol C, bisphenol K, bisphenol Z, bisphenol S, tetramethyl bisphenol A, tetramethyl bisphenol F, tetramethyl bisphenol S, tetramethyl bisphenol Z, etc., with epihalohydrin;

biphenol type epoxy resins as reaction products of biphenols such as biphenol, tetramethylbiphenol, etc., with epihalohydrin; and dihydroxy diphenyl sulfide type epoxy resins as reaction products of dihydroxy diphenyl sulfides such as dihydroxy diphenyl sulfide, 4,4-thiobis (3-methyl-6-tert-butylphenol), etc., with epihalohydrin.

Examples of epoxy resins represented by the general formula (V) include dihydroxybenzene type epoxy resins as reaction products of dihydroxybenzenes such as catechol, resorcin, methyl resorcin, hydroquinone, monomethyl hydroquinone, dimethyl hydroquinone, trimethyl hydroquinone, mono-tert-butyl hydroquinone, di-tert-butyl hydroquinone, etc., with epihalohydrin.

EXAMPLES

Now, the present invention will be further described in detail below with reference to Examples and Comparative examples. It is to be understood, however, that the present invention is not limited to the following Examples. The term "parts" as used herein refers to "parts by weight", unless otherwise specified. Epoxy equivalent, total chlorine content, component with n=0 as measured by GPC, and multi-functional epoxy compound having specified branching structure of the present invention as measured by HPLC, were measured using the methods as described in the following.

Epoxy Equivalent

Sample was dissolved in dioxane, 0.1 N HCl dioxane solution was added and reaction took place at room temperature for 30 minutes. Titration with 0.1 N sodium hydroxide was conducted using cresol red as indicator. Difference of the required amount of titration between the test sample and blank test was determined and the amount of sample was divided by the difference to obtain epoxy equivalent (g/eq).

Total Chlorine Content

Measured value obtained in accordance with JIS K-7246 was taken as total chlorine content (ppm).

(Component with n=0 as Measured by GPC)

GPC Analyzing apparatus HLC-8020 (manufactured by TOSOH Co.) was used for analysis with a differential refractometer as a detector. GPC column SYSTEM consisting of two $G2000H_{XL}$ and one $G1000\ H_{XL}$ was used to separate the component with n=0. Content of the component with n=0 was calculated from the obtained GPC chromatograph by dividing the peak area corresponding to the component with n=0 by the peak area of total components expressed as area percentage (%).

Multi-functional Epoxy Compound having Specified Branching Structure of the Present Invention as Measured by HPLC HPLC Analyzer Series 1100 (manufactured by Agilent Technologies Co.) was used for analysis with an UV visible detector at measuring wavelength of 285 nm. The HPLC column used was Cadenza $CD-C_{18}$ manufactured by Imtakt Co. (Column size, length 100 mm×inner diameter 4.6 mm). The multi-functional epoxy compound having specified branching structure of the present invention was separated using this column. Content of the multi-functional epoxy compound having specified branching structure of the present invention was calculated from the obtained HPLC chromatograph by dividing the peak area corresponding to the multi-functional epoxy compound having specified branching structure by peak area of total components expressed as area percentage (%).

Examples 1~2 and Comparative Examples 1~2

Example 1

In a 1 L separable flask provided with a stirrer, a thermometer, and a condenser, 150 parts of diglycidyl ether of 1,4-di-tert-butyl-2,5-dihydroxy-benzene with epoxy equivalent of 177 g/eq, total chlorine content of 1200 ppm, having the component with n=0 of 89% as measured by GPC, and not containing the multi-functional epoxy compound having the specified branching structure of the present invention as measured by HPLC, and 470 parts of toluene, were introduced and were heated to a temperature of 80° C. to dissolve the resin. At the same temperature, 6.2 parts of solid potassium hydroxide of 97% in concentration was added, and was heated under agitation to a temperature of 115° C., and reaction was conducted for 1 hour at the same temperature.

After completion of the reaction, the reaction product was cooled to 80° C. After 50 parts of water was added to it to dissolve salts, it was allowed to rest to separate and remove the bottom aqueous phase and gel by-product. After neutralization with phosphoric acid solution, the resin solution was washed with water until the drained water became neutral, and was filtered.

Toluene was removed under the condition of 1.33 KPa and 150° C. to obtain the intended resin (epoxy resin A).

Conditions of reaction for this Example are shown in Table 1, and properties, yield, etc., of the obtained resin are shown in Table 2.

Example 2

Same procedure as in Example 1 was followed, except that 9.3 parts of solid potassium hydroxide of 97% in concentration and 0.7 part of water were added and the reaction was conducted at 100° C. for 3 hours, to obtain the intended resin (epoxy resin B).

Conditions of reaction for this Example are shown in Table 1, and properties, yield, etc., of the obtained resin are shown in Table 2.

Comparative Example 1

Same procedure as in Example 1 was followed, except that, in place of solid potassium hydroxide of 97% in concentration, 6.2 parts of sodium hydroxide of 97% in concentration was added and the reaction was conducted at 90° C. for 3 hours, to obtain the intended resin (epoxy resin C).

Conditions of reaction for this Comparative example are shown in Table 1, and properties, yield, etc., of the obtained resin are shown in Table 2.

Comparative Example 2

In a 1 L separable flask provided with a stirrer, a thermometer, and a condenser, 150 parts of diglycidyl ether of 1,4-di-tert-butyl-2,5-dihydroxy-benzene with epoxy equivalent of 176 g/eq, total chlorine content of 1200 ppm, having the component with n=0 of 89% as measured by GPC, and not containing the multi-functional epoxy compound having the specified branching structure of the present invention as measured by HPLC, and 400 parts of methanol, were introduced and were heated to a temperature of 50° C. and stirred at this temperature for 1 hour. While being stirred, the resin was not completely dissolved, and remained in slurry state. Then, the resin was cooled to 30° C., and the precipitated resin was separated by filtration. Methanol was removed from the separated resin under the conditions of 1.33 KPa and 150° C. to obtain the intended resin (epoxy resin D).

Properties, yield, etc., of the resin obtained in this comparative example are shown in Table 2.

TABLE 1

| Manufacturing conditions | Unit | Example 1 | Example 2 | Comparative example 1 |
|---|---|---|---|---|
| Type of alkali metal hydroxide | | Potassium hydroxide | Potassium hydroxide | Sodium hydroxide |
| Form of alkali metal hydroxide | | Solid | Solid | Solid |
| Concentration of alkali metal hydroxide | % | 97 | 97 | 97 |
| Added amount of alkali metal hydroxide per 1 kg of epoxy resin | g | 40 | 60 | 40 |
| Reaction temperature | °C. | 115 | 100 | 85 |
| Concentration of alkali metal hydroxide during reaction | % | 97 | 90 | 97 |

TABLE 2

| Properties, yield, etc. | Unit | Example 1 | Example 2 | Comparative example 1 | Comparative example 2 |
|---|---|---|---|---|---|
| Name of resin | | Epoxy resin A | Epoxy resin B | Epoxy resin C | Epoxy resin D |
| Epoxy equivalent | g/eq | 183 | 181 | 180 | 173 |
| Total chlorine content | ppm | 240 | 460 | 610 | 310 |
| Multi-functional epoxy compound of the invention as measured by HPLC | % | 3.8 | 2.5 | 1.2 | 0.0 |
| Content of n = 0 as measured by GPC | % | 82 | 84 | 82 | 93 |
| Obtained amount | g | 139 | 145 | 122 | 128 |
| Yield | % | 93 | 97 | 81 | 85 |

Example 3~4 and Comparative Example 3~4

Example 3

In a 1 L separable flask provided with a stirrer, a thermometer, and a condenser, 150 parts of diglycidyl ether of 4,4'-dihydroxy-3,3',5,5'-tetramethyl biphenyl with epoxy equivalent of 186 g/eq, total chlorine content of 1100 ppm, having the component with n=0 of 90% as measured by GPC, and not containing the multi-functional epoxy compound having the specified branching structure of the present invention as measured by HPLC, and 470 parts of methyl isobutyl ketone, were introduced and were heated to a temperature of 80° C. to dissolve the resin.

At the same temperature, 8.5 parts of solid potassium hydroxide of 95% in concentration was added, and was heated under agitation to a temperature of 100° C., and reaction was conducted for 1 hour at this temperature. After completion of the reaction, the reaction product was cooled to 80° C. After 50 parts of water was added to it to dissolve salts, it was allowed to rest to separate and remove the bottom aqueous phase and gel by-product. After neutralization with phosphoric acid solution, the resin solution was washed with water until the drained water became neutral, and was filtered. Methyl isobutyl ketone was removed under the condition of 1.33 KPa and 150° C. to obtain the intended resin (epoxy resin E).

Conditions of reaction for this Example are shown in Table 3, and properties, yield, etc., of the obtained resin are shown in Table 4.

Example 4

Same procedure as in Example 3 was followed, except that 6.2 parts of solid potassium hydroxide of 95% in concentration was added and the reaction was conducted at 115° C., to obtain the intended resin (epoxy resin F).

Conditions of reaction for this Example are shown in Table 3, and properties, yield, etc., of the obtained resin are shown in Table 4.

Comparative Example 3

Same procedure as in Example 3 was followed, except that, in place of solid potassium hydroxide of 95% in concentration, 12.7 parts of sodium hydroxide of 49% in concentration was added and the reaction was conducted at 85° C. for 6 hours, to obtain the resin (epoxy resin G). Conditions of reaction for this Comparative example are shown in Table 3, and properties, yield, etc., of the obtained resin are shown in Table 4.

Comparative Example 4

Same procedure as in Example 3 was followed, except that 0.3 part of solid potassium hydroxide of 95% in concentration was added and the reaction was conducted for 3 hours, to obtain the resin (epoxy resin H). Conditions of reaction for this Comparative example are shown in Table 3, and properties, yield, etc., of the obtained resin are shown in Table 4.

TABLE 4

| Properties, yield, etc. | Unit | Example 3 | Example 4 | Comparative example 3 | Comparative example 4 |
| --- | --- | --- | --- | --- | --- |
| Name of resin | | Epoxy resin E | Epoxy resin F | Epoxy resin G | Epoxy resin H |
| Epoxy equivalent | g/eq | 193 | 190 | 190 | 188 |
| Total chlorine content | ppm | 120 | 320 | 780 | 880 |
| Multi-functional epoxy compound of the invention as measured by HPLC | % | 3.6 | 3.2 | 1.3 | 0.4 |
| Content of n = 0 as measured by GPC | % | 83 | 84 | 82 | 78 |
| Obtained amount | g | 142 | 145 | 114 | 146 |
| Yield | % | 95 | 97 | 76 | 97 |

Example 5~6 and Comparative Example 5~6

Example 5

In a 1 L separable flask provided with a stirrer, a thermometer, and a condenser, 150 parts of diglycidyl ether of bisphenol A with epoxy equivalent of 177 g/eq, total chlorine content of 900 ppm, content of the component with n=0 of 90% as measured by GPC, and not containing the multi-functional epoxy compound having the specified branching structure of the present invention as measured by HPLC, and 450 parts of toluene and 20 parts of tert-butyl alcohol, were introduced and were heated to a temperature of 80° C. to dissolve the resin. At the same temperature, 8.4 parts of solid potassium hydroxide of 95% in concentration was added, and was heated under agitation to a temperature of 115° C., and reaction was conducted for 1 hour at this temperature.

After completion of the reaction, the reaction product was cooled to 80° C. After 50 parts of water was added to it to dissolve salts, it was allowed to rest to separate and remove the bottom aqueous phase and gel by-product. After neu-

TABLE 3

| Manufacturing conditions | Unit | Example 3 | Example 4 | Comparative example 3 | Comparative example 4 |
| --- | --- | --- | --- | --- | --- |
| Type of alkali metal hydroxide | | Potassium hydroxide | Potassium hydroxide | Sodium hydroxide | Potassium hydroxide |
| Form of alkali metal hydroxide | | Solid | Solid | Liquid | Solid |
| Concentration of alkali metal hydroxide | % | 95 | 95 | 49 | 95 |
| Added amount of alkali metal hydroxide per 1 kg of epoxy resin | g | 54 | 40 | 40 | 2 |
| Reaction temperature | ° C. | 100 | 115 | 85 | 115 |
| Concentration of alkali metal hydroxide during reaction | % | 95 | 95 | 49 | 95 | tralization with phosphoric acid solution, the resin solution was washed with water until the drained water became neutral, and was filtered.

Toluene was removed under the condition of 1.33 KPa and 150° C. to obtain the intended resin (epoxy resin K). Conditions of reaction for this Example are shown in Table 5, and properties, yield, etc., of the obtained resin are shown in Table 6.

Example 6

Same procedure as in Example 5 was followed, except that 6.3 parts of solid potassium hydroxide of 95% in concentration was added and the reaction was conducted at 95° C. for 3 hours, to obtain the intended resin (epoxy resin L). Conditions of reaction for this Example are shown in Table 5, and properties, yield, etc., of the obtained resin are shown in Table 6.

Comparative Example 5

In a 1 L separable flask provided with a stirrer, a thermometer, a condenser, and an oil-water separator, 150 parts of diglycidyl ether of bisphenol A with epoxy equivalent of 178 g/eq, total chlorine content of 900 ppm, content of the component with n=0 of 90% as measured by GPC, and not containing the multi-functional epoxy compound having the specified branching structure of the present invention as measured by HPLC, and 470 parts of toluene, were introduced and were heated to a temperature of 80° C. to dissolve the resin. At the same temperature, 12 parts of sodium hydroxide of 48% in concentration was added, and was heated under agitation to a temperature of 90° C., and reaction was conducted for 1 hour at this temperature.

During heating and reaction, water was boiled in azeotrope with toluene, and was passed through the oil-water separator to remove water out of the system. After completion of reaction, the reaction product was cooled to 80° C. After 50 parts of water was added to it to dissolve salts, it was allowed to rest to separate and remove the bottom aqueous phase and gel by-product. After neutralization with phosphoric acid solution, the resin solution was washed with water until the drained water became neutral, and was filtered. Toluene was removed under the condition of 1.33 KPa and 150° C. to obtain the intended resin (epoxy resin M). Conditions of reaction for this Example are shown in Table 5, and properties, yield, etc., of the obtained resin are shown in Table 6.

TABLE 5

| Manufacturing conditions | Unit | Example 5 | Example 6 | Comparative example 5 |
|---|---|---|---|---|
| Type of alkali metal hydroxide | | Potassium hydroxide | Potassium hydroxide | Sodium hydroxide |
| Form of alkali metal hydroxide | | Solid | Solid | Liquid |
| Concentration of alkali metal hydroxide | % | 95 | 95 | 48 |
| Added amount of alkali metal hydroxide per 1 kg of epoxy resin | g | 53 | 40 | 40 |
| Reaction temperature | ° C. | 100 | 115 | 90 |
| Concentration of alkali metal hydroxide during reaction | % | 95 | 95 | 48 |

TABLE 6

| Properties, yield, etc. | Unit | Example 5 | Example 6 | Comparative example 5 |
|---|---|---|---|---|
| Name of resin | | Epoxy resin K | Epoxy resin L | Epoxy resin M |
| Epoxy equivalent | g/eq | 184 | 180 | 179 |
| Total chlorine content | Ppm | 110 | 280 | 600 |
| Multi-functional epoxy compound of the invention as measured by HPLC | % | 4.2 | 3.8 | 1.9 |
| Content of n = 0 as measured by GPC | % | 88 | 87 | 82 |
| Obtained amount | g | 132 | 140 | 118 |
| Yield | % | 88 | 93 | 77 |

Comparative Manufacture Example 1

In a 1 L separable flask provided with a stirrer, a thermometer, and a condenser, 100 parts of epoxy resin E, 2.2 parts of 1,4-di-tert-butyl-2,5-dihydroxy-benzene, and 5 parts of xylene were mixed and heated to a temperature of 130° C. At the same temperature, 0.5 part of triphenyl phosphine was added, and reaction was conducted at 160° C. for 5 hours. After completion of the reaction, xylene was removed by evaporation to obtain epoxy resin (epoxy resin N) with epoxy equivalent of 183 g/eq, total chlorine content of 290 ppm, content of the component n=0 of 83% as measured by GPC, and not containing multi-functional epoxy compound having the specified branching structure of the present invention as measured by HPLC.

Example 7~8 and Comparative Example 6~7

Epoxy resin compositions were blended using the epoxy resins A~B and epoxy resins C~D as shown in Table 2, and epoxy resin N prepared in the Comparative manufacture example 1 in order to clearly show the effect of the present invention, and phenol aralkyl resin as a curing agent for epoxy resin, triphenyl phosphine as a curing accelerator, Carnauba Wax as releasing agent, epoxy silane as a silane coupling agent, and using spherical silica powder as inorganic filler in an amount of 87% by weight relative to total weight of the epoxy resin, curing agent for the epoxy resin and silica powder.

Then, each blend was kneaded at a temperature of 100~120° C., and after cooling, was pulverized to obtain each material. Each blend is shown in Table 7. Each material was molded using a low pressure transfer molding machine at under conditions of die temperature of 170° C. and pressure of 64 kg/cm$^2$, for molding time of 120 seconds, to obtain each test sample. These samples were subjected to post-cure processing at 180° C. for 6 hours. Various measurements were performed on the obtained samples, including flexural strength and elastic modulus at room temperature, flexural strength and elastic modulus when heated to a temperature of 250° C., glass transition temperature, coefficient of water absorption at 85° C. and relative humidity of 85% for 72 hours, and electrical conductivity of pure water and total extracted chlorine ion content when the sample was frozen and pulverized to 100~150 mesh, and 10 g of the pulverized sample and 40 g of pure water was extracted in a Teflon pressure vessel at 180° C. for 30 hours, and the results of the measurement are shown in Table 8.

TABLE 7

| Blending ratio | Unit | Example 7 | Example 8 | Comparative example 6 | Comparative example 7 | Comparative manufacture example 1 |
|---|---|---|---|---|---|---|
| Type of epoxy resin | | Epoxy resin A | Epoxy resin B | Epoxy resin C | Epoxy resin D | Epoxy resin N |
| Epoxy resin | parts | 100 | 100 | 100 | 100 | 100 |
| Curing agent for epoxy resin *1 | parts | 95.5 | 96.6 | 94.1 | 101 | 95.5 |
| Inorganic filler *2 | parts | 1308 | 1316 | 1299 | 1345 | 1308 |
| Curing accelerator *3 | parts | 2.3 | 2.3 | 2.3 | 2.3 | 2.3 |
| Releasing agent | parts | 1.9 | 1.9 | 1.9 | 1.9 | 1.9 |
| Silane coupling agent *4 | parts | 9 | 9 | 9 | 9 | 9 |
| Carbon black | parts | 1 | 1 | 1 | 1 | 1 |

*1: Phenol aralkyl resin MEH-7800S, hydroxyl equivalent of 175 g/eq, manufactured by Meiwa Plastic Industries Co.
*2: manufactured by Denki Kagaku Kogyo Co. Spherical fused silica powder blended in the following ratio.
20% by weight of FB-60 with average particle size of 25 μm.
50% by weight of FB-35 with average particle size of 10 μm.
30% by weight of SO-C3 with average particle size of 0.7 μm.
*3: Triphenyl phosphine
*4: Eoxy silane KBM-403, manufactured by Shinetsu Silicone Co.

TABLE 8

| Characteristic values | Unit | Example 7 | Example 8 | Comparative example 6 | Comparative example 7 | Comparative manufacture example 1 |
|---|---|---|---|---|---|---|
| Type of epoxy resin | | Epoxy resin A | Epoxy resin B | Epoxy resin C | Epoxy resin D | Epoxy resin N |
| Flexural strength at room temperature | kg/mm² | 11.85 | 11.87 | 11.82 | 12.08 | 11.21 |
| Flexural elastic modulus at room temperature | kg/mm² | 1460 | 1480 | 1480 | 1560 | 1405 |
| Flexural strength when heated | kg/mm² | 0.88 | 0.90 | 0.82 | 0.91 | 0.72 |
| Flexural elastic modulus when heated | kg/mm² | 45.2 | 46.5 | 45.8 | 55.3 | 45.3 |
| Glass transition temperature | ° C. | 114 | 115 | 107 | 117 | 110 |
| Water absorption ratio | % | 0.175 | 0.178 | 0.182 | 0.186 | 0.188 |
| Electrical conductivity | μS/cm | 48 | 90 | 125 | 88 | 105 |
| Chlorine ion | ppm | 13 | 23 | 62 | 20 | 42 |

INDUSTRIAL APPLICABILITY

The high purity epoxy resin of the present invention has excellent thermal resistance, low hygroscopicity, and excellent mechanical properties. In addition, since elution of ionic impurities is low, the epoxy resin of the invention can be advantageously used in an epoxy resin composition as sealing material in the field of electric and electronic devices. The manufacturing method for manufacturing the high purity epoxy resin according to the present invention is industrially useful in that it permits the high purity epoxy resin of the invention to be produced easily and at high yield.

The invention claimed is:

1. A process for production of a high-purity epoxy compound with total chlorine content of less than 500 ppm, said process comprising:

reacting an epoxy compound according to formula (I):

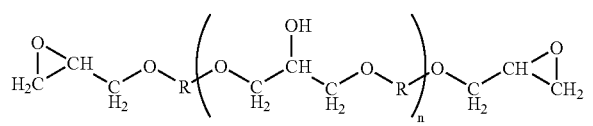

wherein,
R represents a dihydric phenol compound residue and/or a dihydric alcohol compound residue, and
n represents a numerical value with the average greater than 0 and not greater than 10, in which the proportion of the component having n equal to 0 is more than 70% and less than 100%, in the presence of alkali metal hydroxide at temperature of 95° C.-150° C., to produce an epoxy compound according to formula (II):

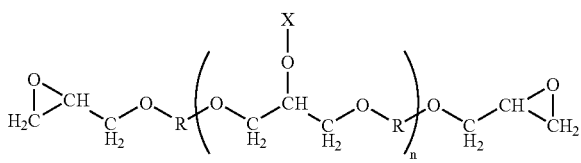

wherein,
R represents a dihydric phenol compound residue and/or a dihydric alcohol compound residue,
n represents a numerical value with the average greater than 0 and not greater than 10, and X is a hydrogen atom or a group according to formula (III):

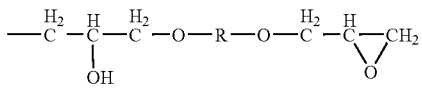

wherein,
R has the above-described meaning in which the component with X represented by the-general formula (III) is always contained.

2. A process according to claim 1, wherein the resultant epoxy compound obtained by the process contains the epoxy compound of formula (I) in the proportion of not less than 90% and less than 100%, and the epoxy compound of formula (II) in the proportion of greater than 0% and not greater than 10%.

3. A process according to claim 1, wherein said alkali metal hydroxide is potassium hydroxide.

4. A process according claim 1, wherein 5-100 g of potassium hydroxide is used per 1 kg of said epoxy compound of formula (I), and is used in the reaction in the form of aqueous solution of potassium hydroxide of 80% or higher in concentration.

5. A process according to claim 1, wherein the reaction is conducted in the presence of a tertiary alcohol.

6. A process according to claim 1, wherein said epoxy compound of formula (I) is an epoxy compound according to formula (IV):

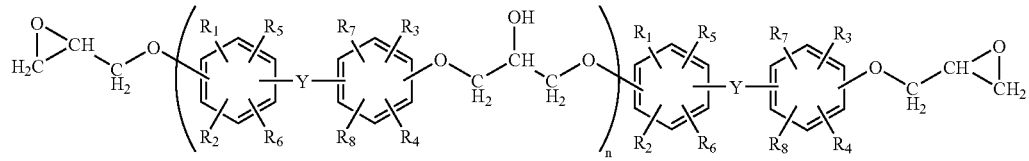

wherein,
$R_1$-$R_8$ may be same or different, and each of $R_1$-$R_8$ is a hydrogen, alkyl, allyl, phenyl group or halogen atoms,
Y represents a direct bond, alkyl group with carbon number of 1-20, allyl, phenyl, aralkyl, biphenylaralkyl, oxygen, sulphur, sulfone, or carboxyl group; and
n is a numerical value with average greater than 0 and not greater than 10; and/or an epoxy compound according to formula (V):

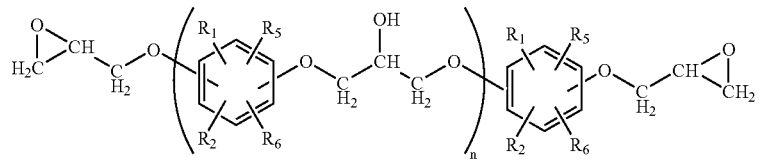

wherein,
$R_1$, $R_2$, $R_5$, and $R_6$ represent hydrogen, alkyl, allyl, phenyl group, or halogen atom, and may be same or different; and n is a numerical value with average greater than 0 and not greater than 10.

7. A process for according to claim 6, wherein said epoxy compound of formula (IV) is a tetramethyl bisphenol epoxy resin or a tetramethyl biphenyl epoxy resin.

8. A process according to claim 1, wherein the resultant epoxy compound obtained by the process has a total chlorine content of less than 350 ppm.

9. A process according to claim 1, wherein, for the epoxy of the compound of Formula (I) that is to be reacted, the proportion of the epoxy compound having n equal to 0 is 75%-99%.

10. A process according to claim 1, wherein, for the epoxy of the compound of Formula (I) that is to be reacted, the proportion of the epoxy compound having n equal to 0 is 80%-99%.

11. A process according to claim 2, wherein the resultant epoxy compound obtained by the process contains the epoxy compound of formula (II) in an amount of 1-10%.

12. A process according to claim 11, wherein the resultant epoxy compound obtained by the process contains the epoxy compound of formula (II) in an amount of 1-6%.

13. A process according to claim 12, wherein the resultant epoxy compound obtained by the process contains the epoxy compound of formula (II) in an amount of 2-5%.

* * * * *

UNITED STATES PATENT AND TRADEMARK OFFICE
CERTIFICATE OF CORRECTION

PATENT NO. : 7,268,192 B2  
APPLICATION NO. : 10/511553  
DATED : September 11, 2007  
INVENTOR(S) : Hikeyasu Asakage It is certified that error appears in the above-identified patent and that said Letters Patent is hereby corrected as shown below:

Column 21, line 13, reads "meaning in which" should read -- meaning, in which --  
Column 21, line 14, reads "the-general" should read -- the general --  
Column 21, line 46, reads "or halogen atoms," should read -- or halogen atom; --  
Column 21, line 51, begin new line after "greater than 10;"  
Column 22, line 5, reads "process for according" should read -- process according --

Signed and Sealed this

Fifth Day of August, 2008

JON W. DUDAS  
*Director of the United States Patent and Trademark Office*